March 17, 1959 W. K. SQUIRES 2,878,311

KEYED A. G. C. AND SYNC SEPARATOR CIRCUIT

Filed Aug. 10, 1954

INVENTOR.
William K. Squires
BY Mason, Kolehmainen, Rathburn & Wyss, Att'ys

United States Patent Office 2,878,311

Patented Mar. 17, 1959

2,878,311

KEYED A. G. C. and SYNC SEPARATOR CIRCUIT

William K. Squires, Snyder, N. Y., assignor to Sylvania Electric Products Inc., a corporation of Massachusetts Application August 10, 1954, Serial No. 448,949

3 Claims. (Cl. 178—7.3)

Figures 1, 2:
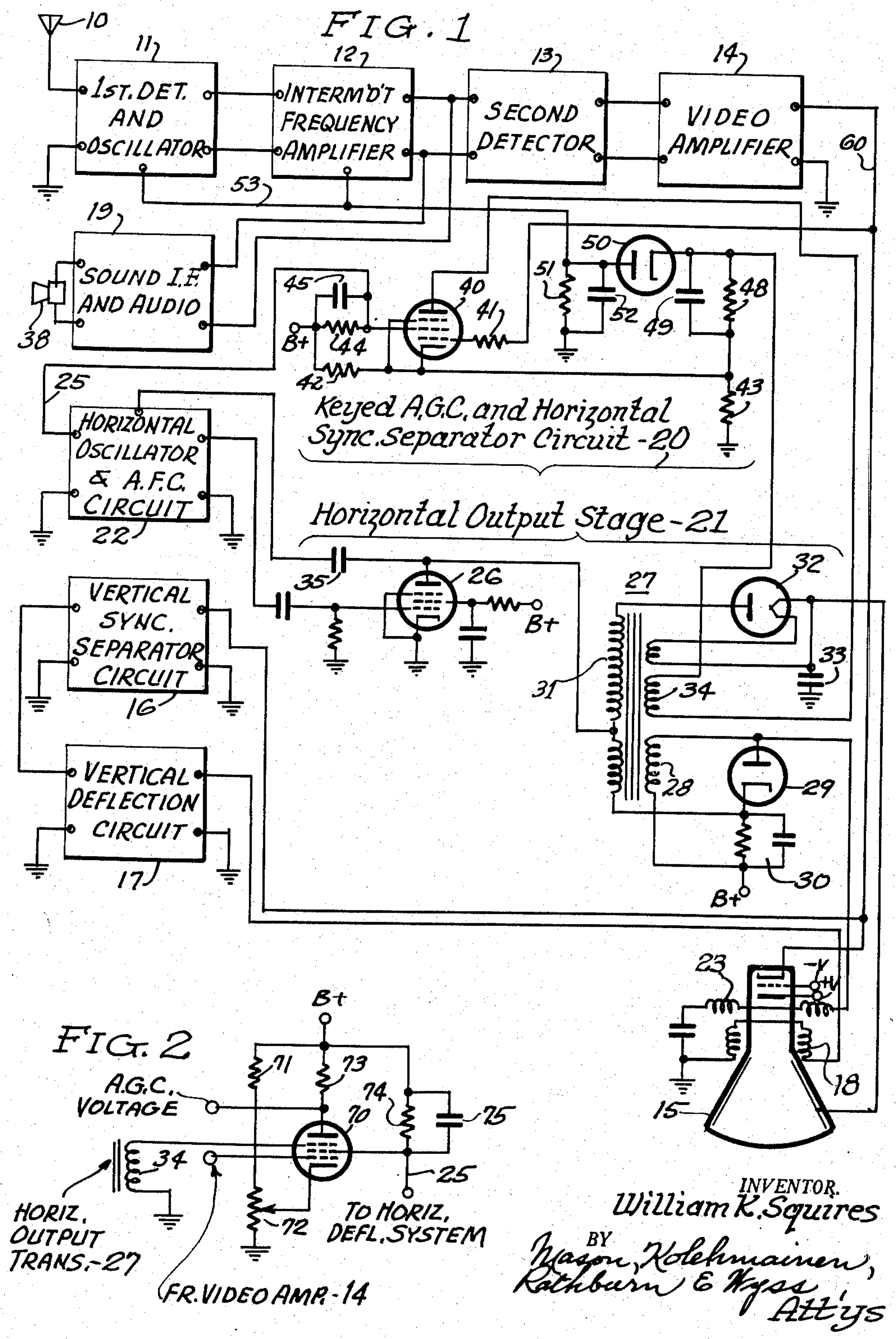

The present invention relates to television receivers, more particularly to the automatic gain control and deflection synchronizing portions of television receivers, and the invention has for an object the provision of a combined keyed AGC and sync separator circuit wherein the horizontal synchronizing signals may be separated from the other portions of the composite video wave in a simple and economical manner and without requiring a separate synchronizing signal separator tube.

In many present day television receivers there is provided a so-called keyed AGC circuit wherein an automatic gain control voltage is derived under the control of keying or sampling pulses which occur during the horizontal retrace interval so that variations in picture level do not affect the automatic gain control voltage. This automatic gain control voltage is employed to control the gain of the receiver so that all television stations having signal strengths above a predetermined minimum or threshold level are received with approximately the same gain setting in the receiver. However, the keyed AGC circuit does not normally provide a control voltage for signal input levels below the AGC threshold so that no automatic gain control action is provided for stations in the outlying or fringe reception areas. On the other hand, the horizontal deflection circuit of the television receiver must be synchronized with a received television signal even though the signal input level falls below the AGC threshold so that the transmitted image may be reproduced even though the received signal strength is very small. Accordingly, it is customary to provide a separate synchronizing signal separator tube which is employed to separate the synchronizing signals from the other portions of the composite video wave so that the deflection circuits of the receiver are maintained in synchronism with the received television signal down to very low signal levels. It is, therefore, another object of the present invention to provide a new and improved keyed AGC and horizontal synchronizing signal separator circuit wherein suitable horizontal synchronizing information is obtained without employing a special separator tube and at signal input levels below the AGC threshold.

Briefly, in accordance with one phase of the invention, the television receiver is provided with a combined automatic gain control and horizontal synchronizing signal separator tube and the composite video signal is applied to the control grid of this tube. Keying pulses are derived from the horizontal scanning circuit of the receiver and are impressed upon the anode of the keyed AGC and sync separator control tube so as to provide anode potential for the tube during the keying periods. However, the screen grid of the control tube is continuously energized so that screen current flows whenever the grid voltage rises above the cut off point and horizontal synchronizing signals may be derived from the screen circuit of the tube even though anode current flows in the control tube only during the applied keying pulses. The anode circuit of the control tube is employed to derive a substantially unidirectional automatic gain control voltage which is impressed upon the amplifier tubes of the receiver to control the gain thereof in a conventional manner. In a preferred embodiment of the invention, a biased rectifier arrangement is employed to provide a minimum AGC threshold level while permitting horizontal synchronizing signal information to be derived from the screen grid circuit of the control tube during periods when the signal input level is below the AGC threshold.

The invention, both as to its organization and method of operation, together with further objects and advantages thereof, will best be understood by reference to the following specification taken in connection with the accompanying drawing, in which:

Fig. 1 is a schematic diagram of a television receiver, partly in block diagram form, which embodies the features of the present invention; and Fig. 2 is a schematic diagram of an alternative embodiment of the present invention.

Referring now to the drawing, the system illustrated therein comprises a modulated carrier wave television receiver of the superheterodyne type including an antenna system 10 connected to a first detector and oscillator 11, to which are connected in cascade relation in the order named, an intermediate frequency amplifier 12, a second detector 13, a video amplifier 14 and a cathode ray tube viewing device 15. A vertical sync separator circuit 16 is connected to the output of the video amplifier 14 and controls a vertical deflection circuit 17 so as to produce the desired vertical scanning wave in the vertical deflection coils 18 which surround the neck of the cathode ray tube 15. A combined keyed AGC and horizontal sync separator circuit 20 is provided in accordance with the principles of the present invention and is connected to receive the video wave developed by the video amplifier 14 and is also connected to receive keying pulses from the horizontal deflection output stage 21, as will be described in more detail hereinafter. The horizontal output stage 21 is controlled by a horizontal oscillator and AFC circuit 2 which latter unit receives horizontal synchronizing signal information from the circuit 20, the horizontal output stage 21 developing a horizontal scanning wave in the horizontal deflection coils 23 which surround the neck of the cathode ray tube 15.

The units 10 to 17, inclusive, 21 and 22 may all be of conventional well known construction, so that a detailed description thereof is considered unnecessary herein. Referring briefly, however, to the operation of the above described system as a whole, television signals intercepted by the antenna circuit 10 are applied to the oscillator-detector 11 wherein they are converted into intermediate frequency signals which are, in turn, selectively amplified in the intermediate frequency amplifier 12 and are detected in the second detector 13. The modulation components of the received signal which are detected in the second detector 13 are supplied to the video frequency amplifier 14 wherein they are amplified and impressed upon the cathode of the cathode ray tube 15, the control grid of the cathode ray tube 15 being suitably biased for correct background level of the reproduced image. The composite video signal developed by the video amplifier 14 is also connected to a vertical synchronizing signal separator circuit 16 wherein the vertical synchronizing signals are separated from the horizontal synchronizing signals and the picture components of the video wave, the separated vertical synchronizing pulses being employed to control the vertical deflection circuit 17 in a conventional manner. In this connection it will be understood that the vertical sync separator circuit 16 may comprise a simple plural section, low pass filter having a suitable transfer charcteristic to pass the 60 cycle vertical synchronizing pulses and reject the undesired components of the composite video wave.

The keyed AGC and horizontal sync separator circuit 20 functions in a manner to be described in more detail hereinafter to provide horizontal synchronizing pulses which are connected by way of the conductor 25 to the horizontal oscillator and AFC circuit 22, so that a horizontal scanning wave is impressed upon the control grid of the output tube 26 in the horizontal output stage 21. The tube 26 drives a horizontal output transformer indicated generally at 27 which is provided with a secondary winding 28 connected to the horizontal deflection yoke 23, and a power conservation circuit including the damping diode 29 and the filter circuit 30 are connected to provide increased B+ voltage for the anode of the tube 26, as will be readily understood by those skilled in the art. The transformer 27 is provided with a high voltage winding 31 which is connected to the high voltage rectifier 32 so as to provide an accelerating anode potential for the cathode ray tube 15 across the high voltage filter condenser 33. In addition, the horizontal output transformer 27 is provided with an auxiliary winding 34 which is employed as a source of keying pulses which occur at the horizontal scanning rate, these keying pulses being supplied to the keyed AGC and horizontal sync separator tube 20 for reasons to be described in more detail hereinafter. A feedback signal from the horizontal output stage 21 is coupled through the condenser 35 to the circuit 22 so as to permit a comparison of the phase relationship between the horizontal output pulses and the horizontal synchronizing signals derived from the circuit 20 so that the horizontal oscillator may be maintained in synchronism with the received television signal. An intercarrier sound signal is derived from the second detector 13 is amplified in the sound IF amplifier 19 and the audio signal is detected and supplied to the loud speaker 38 in a conventional manner.

Referring now more particularly to the keyed AGC and sync separator circuit 20 in relation to the other portions of the receiver, the circuit 20 includes a pentode control tube 40, preferably of the commercial type 6AU6, the control grid of the tube 40 being connected to the output of the video amplifier 14 through the resistor 41. The cathode of the tube 40 is biased positively by means of a voltage divider network including a resistor 42, connected between the B+ supply and the cathode of the tube 40, and a resistor 43 connected between the cathode of the tube 40 and ground. The screen grid of the tube 40 is continuously energized from the B+ supply through the screen grid load resistor 44, a condenser 45 being connected across the resistor 44 so that a filter network is provided having a time constant of the correct value to permit separation of the horizontal synchronizing pulses from the composite video wave. The anode of the tube 40 is connected to one end of the auxiliary winding 34 on the horizontal output transformer 27, the other end of the winding 34 being connected through a resistor 48 to the cathode of the tube 40. A condenser 49 is connected across the resistor 48, the resistor 48 and condenser 49 forming a filter network having a relatively long time constant so that a substantially unidirectional control voltage is produced thereacross which is proportional to the strength of the video signal during the horizontal retrace intervals. The cathode of a delay diode rectifier 50 is connected to the negative terminal of the condenser 49, the anode of the diode 50 being connected to a parallel connected resistor 51 and condenser 52, the other ends of which are connected to ground. The delayed AGC voltage developed across the condenser 52 is connected by way of the conductor 53 to the amplifier tubes in the intermediate frequency amplifier 12 and, if desired, to the input stage 11 in the event that an R. F. amplifier is employed, so that the gain of the intermediate frequency amplifying channel is controlled in accordance with changes in the signal strength of the received television signal, as will be readily understood by those skilled in the art.

Considering now the operation of the circuit 20 in providing both horizontal synchronizing signal information and an automatic gain control voltage, it will be evident from the foregoing description that the anode of the tube 40 is energized only during periods when keying pulses are developed across the winding 34, these keying pulses serving as operating anode potential during the pulse intervals thereof. However, since the screen grid of the tube 40 is continuously energized from the B+ supply the synchronizing signal portion of the video wave impressed upon the control grid of the tube 40 appears in amplified form across the screen grid load resistor 44. In this connection it will be understood that the D. C. potential of the output conductor 60 of the video amplifier 14 is so adjusted relative to the cathode potential of the tube 40 that the grid cut off point of the tube 40 is set just slightly above the blanking level of the composite video wave appearing upon the conductor 60 and the synchronizing pulses, which are of greater amplitude than the blanking level, cause a flow of screen grid current in the screen grid circuit of the tube 40 even though the video signal is of relatively small amplitude. The time constant of the resistor 44 and the condenser 45 is chosen so as to select the horizontal synchronizing pulses from the other components of the video wave, and the negative synchronizing pulses developed across the network 44, 45 are transmitted by way of the conductor 25 to the circuit 22 wherein they are utilized to maintain the horizontal oscillator in synchronism with the received television signal in any conventional manner. In the illustrated embodiment, the phase of the synchronizing pulses appearing on the conductor 25 is compared with the phase of the output pulses fed back through the condenser 35 from the anode of the tube 26, the phase comparison voltage thus developed being employed to control the frequency of the horizontal oscillator through a suitable reactance tube or other similar control device.

When a keying pulse is developed across the winding 34 the anode of the tube 40 is made highly positive with respect to the cathode of this tube so that anode current flows through the winding 34 and charges the condenser 49 in proportion to the strength of the synchronizing pulse portions of the video signal impressed upon the control grid of the tube 40. The condenser 49 is made relatively large so that a substantially unidirectional control voltage is developed thereacross which is of the polarity indicated in Fig. 1 so that the cathode of the diode 50 becomes increasingly negative as the amplitude of the received signal increases. However, the positive bias potential developed across the resistor 43 opposes the control voltage developed across the condenser 49 so that the diode 50 does not conduct until the voltage developed across the condenser 49 exceeds the bias potential developed across the resistor 43. The filter network 51, 52, the diode 50 and the filter network 48, 49 are connected in series circuit relation through the ground connection to the chassis, so that a delayed AGC action is provided. Thus, when the control voltage across the condenser 49 exceeds the bias potential developed across the resistor 43 the diode 50 conducts and a voltage is produced across the condenser 52 which is proportional to this voltage difference and is negative with respect to ground. The negative AGC voltage thus produced across the network 51, 52 is applied to the control grids of the amplifier tubes in the intermediate frequency amplifier 12 so as to reduce the gain thereof when the amplitude of the video signal increases above the AGC threshold so that uniform reception of all television stations is provided. However, it will be noted that the delayed AGC action does not interfere with the detection of horizontal synchronizing signals at the screen grid of the tube 40 even though the video signal input level is below the AGC threshold, since under these conditions the tube 40 continues to conduct although the control voltage developed across the condenser 49 is not sufficient to render the diode 50 conductive. In this connection it will be understood that the diode 50 and filter circuit 51, 52 may be eliminated and the AGC connection taken directly from the condenser 49 in the event that delayed AGC action is not required. It will also be understood that in the event that the cathode potential of the tube 40 must be at a higher positive potential than the required AGC delay bias potential, so as to adjust the grid cut off point of the tube 40 at the blanking level of the video signal on the conductor 60, an additional resistor may be connected in the voltage divider network 42, 43 between the cathode of the tube 40 and the resistor 43, as will be readily apparent to those skilled in the art.

In Fig. 2 there is shown an alternative embodiment of the present invention wherein a keyed AGC voltage and horizontal synchronizing pulses are derived from a common tube. Referring to this figure, a pentode tube 70, preferably of the commercial type 6AS6, is employed and the video signal from the amplifier 14 is impressed upon the control grid of the tube 70. The cathode of the tube 70 is biased positively by means of the resistor 71 and the AGC level setting potentiometer 72 connected in series between the B+ supply and ground. In the embodiment of Fig. 2 both the anode and screen grid of the tube 70 are continuously energized from the B+ supply, the anode having a load resistor 73 and the screen grid having a load resistor 74 across which is connected the time constant condenser 75. In order to limit the flow of anode current in the tube 70 to the keying pulse intervals so that substantial immunity from noise pulses and other disturbances which occur during the picture intervals is obtained, the winding 34 on the horizontal output transformer 27 is connected between ground and the suppressor grid of the tube 70, an AGC voltage being derived from the anode of the tube 70. In the embodiment shown in Fig. 2, the cathode potential of the tube 70 is adjusted by means of the potentiometer 72 so that the synchronizing signal portions of the video wave impressed upon the control grid of the tube 70 are repeated across the screen grid resistor 74, the time constant of the resistor 74 and condenser 75 being so chosen that the horizontal synchronizing pulses are selected. The flow of anode current is controlled by the potential of the suppressor grid of the tube 70 so that anode current flows only during keying pulse intervals and a voltage is produced across the anode resistor 73 which is proportional to the amplitude of the synchronizing pulse portions of the video signal impressed upon the control grid of the tube 70. The voltage thus produced across the resistor 73 is then integrated by means of a suitable filter network (not shown) so that an AGC voltage is derived which may be employed to control the amplifier tubes in the I. F. amplifier 12 in any suitable manner.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In a television receiver, an amplifying channel for amplifying a received television signal, means for detecting said amplified television signal to derive a video signal therefrom including horizontal synchronizing signal components, a horizontal, scanning circuit, means for deriving keying pulses from said scanning circuit which occur at the horizontal scanning rate, a combined automatic gain control and horizontal synchronizing signal separator tube, means for impressing said video signal on the control grid of said tube to cause flow of screen grid current therein during the synchronizing signal periods of said video signal, means for deriving from the screen grid of said tube the horizontal synchronizing signal components of said video signal, means utilizing said derived horizontal synchronizing signal components to maintain said scanning circuit in synchronism with the received television signal, means for impressing said keying pulses between the anode and cathode of said tube to provide operating anode potential during the pulse intervals thereof, means in series circuit relation with said last named means for deriving a substantially unidirectional voltage proportional to the strength of said video signal, and delayed automatic gain control means controlled in part by said unidirectional voltage deriving means for impressing an automatic gain control voltage on said amplifying channel when said video signal exceeds a predetermined minimum amplitude level.

2. In a television receiver, an amplifying channel for amplifying a received television signal, means for detecting said amplified television signal to derive a video signal therefrom including horizontal synchronizing signal components, a horizontal scanning circuit including a source of keying pulses which occur at the horizontal scanning rate, a combined automatic gain control and horizontal synchronizing signal separator tube, means for impressing said video signal on the control grid of said tube to cause flow of screen grid current therein during the synchronizing signal periods of said video signal, means for deriving from the screen grid of said tube the horizontal synchronizing signal components of said video signal, means utilizing said derived horizontal synchronizing signal components to maintain said scanning circuit in synchronism with the received television signal, means connecting said source of keying pulses between the anode and cathode of said tube to provide anode potential during the pulse intervals thereof, a filter network connected in series with said source of keying pulses for deriving a control voltage proportional to the strength of said video signal, a source of bias potential connected between said filter network and a point of fixed potential to oppose said control voltage, means including a rectifier connected to said filter network for deriving an automatic gain control voltage which is negative with respect to said point of fixed potential when said control voltage is larger than said bias potential, and means for impressing said automatic gain control voltage on said amplifying channel to control the gain thereof.

3. In a television receiver, an amplifying channel for amplifying a received television signal, means for detecting said amplifed television signal to derive a video signal therefrom including horizontal synchronizing signal components, a horizontal scanning circuit including an output transformer, said transformer having a winding across which keying pulses are developed at the horizontal scanning rate, a combined automatic gain control and horizontal synchronizing signal separator tube, means for impressing said video signal on the control grid of said tube to cause flow of screen grid current therein during the synchronizing signal periods of said video signal, means for deriving from the screen grid of said tube the horizontal synchronizing signal components of said video signal, means utilizing said derived horizontal synchronizing signal components to maintain said scanning circuit in synchronism with the received television signal, a first filter network, means connecting said winding and said first filter network in series between the anode and cathode of said tube, whereby a control voltage is produced across said first filter network proportional to the strength of said video signal, a source of bias potential connected between said filter network and a point of fixed potential in a polarity to oppose said control voltage, a second filter network connected to said point of fixed potential, a rectifier connected between said first and second filter networks so that an automatic gain control voltage is developed across said second filter network when said control voltage is larger than said bias potential, and means for impressing said automatic gain control voltage on said amplifying channel to control the gain thereof.

References Cited in the file of this patent

UNITED STATES PATENTS

| | | |
|---|---|---|
| 2,402,096 | Somers | June 11, 1946 |
| 2,632,802 | Vilkomerson et al. | Mar. 24, 1953 |
| 2,636,939 | Wissel et al. | Apr. 28, 1953 |